United States Patent [19]

Works

[11] 4,412,281
[45] Oct. 25, 1983

[54] DISTRIBUTED SIGNAL PROCESSING SYSTEM

[75] Inventor: George A. Works, Stow, Mass.

[73] Assignee: Raytheon Company, Lexington, Mass.

[21] Appl. No.: 168,899

[22] Filed: Jul. 11, 1980

[51] Int. Cl.³ .................................... G06F 11/20
[52] U.S. Cl. .................... 364/200; 371/9; 371/10
[58] Field of Search ............ 364/200 MS File; 371/8, 371/9, 10, 11

[56] References Cited

U.S. PATENT DOCUMENTS

| 3,905,023 | 9/1975 | Perpiglia | 364/200 |
| 4,130,865 | 12/1978 | Heart et al. | 364/200 |
| 4,228,496 | 10/1980 | Katzman et al. | 364/200 |

Primary Examiner—Thomas M. Heckler
Attorney, Agent, or Firm—Walter F. Dawson; Joseph D. Pannone

[57] ABSTRACT

A distributed, fault-tolerant, self-repairable, reconfigurable signal processing system with redundant elements comprising signal processors, mass memories and input-output controllers interconnected by redundant busses forming a high reliability system. The input-output controller element has redundant busses for interconnecting multiple fault-tolerant distributed signal processing systems into a network configuration. One signal processor element in a system is initially designated as the executive and assigns processing tasks from a mass memory to the other elements or other systems. When a failure is detected, the executive verifies the failure, isolates the faulty element and reassigns the task to another spare element. If another element is not available, the executive reconfigures the system to permit degraded operation using the available elements. The executive element, itself, is fault monitored by one of the other elements which is capable of assuming the role of executive as required. The fault-tolerant and reconfiguration capabilities of the system result from a virtual addressing technique for each element, a distributed bus arbitration method and a two-level distributed operating system.

52 Claims, 7 Drawing Figures

DISTRIBUTED SIGNAL PROCESSING SYSTEM

BACKGROUND OF THE INVENTION

High throughout signal processors are required for many modern sensor, communication and control system applications. Said signal processors are often implemented as parallel or distributed combinations of several signal processing elements which are either identical or of a small number of types, in order to reduce the signal processor's design, fabrication or maintenance costs. Parallel or distributed implementations are also preferred for applications in which the total signal processing capacity required is not precisely known at the inception of design, or else is expected to change during the useful life of the equipment, due to modifications to the equipment or changes in the application. In these applications, signal processing elements may be added or deleted as needed to adjust the available signal processing capacity to the requirements of the application.

Prior art attempts to construct highly reliable self-repairing systems by the use of automatic substitution of spare system elements; however, the intricate switching networks or reconfiguration control hardware required to accomplish the spared element substitution, in addition to extensive checking circuitry, generally provide another source of single-point failures, thereby defeating the intended fault-tolerant goals. The use of switching and checking circuitry separate from the active system elements generally requires extensive redesign of the circuitry if system elements are later added or deleted, thereby defeating the intent of achieving a flexible system design through parallelism.

Other prior art attempts to achieve high system reliability have included triple or higher modular redundancy where each element is duplicated three or more times and a poll is taken among the elements. The majority vote among the plurality of elements is taken to be the correct output. These attempts lead to fault-free systems in which the failure of one element has no impact whatsoever on the performance of the system, and may be preferred for applications which require that the system make no errors over a relatively short period. The reliability of such systems diminishes over longer periods, however, when the probability of multiple element failures becomes significant. These attempts are particularly disadvantageous for applications which require only a self-repairing rather than a fault-free system, in that large numbers of extra components are required. These extra components increase both the initial cost of the system and the cost of maintaining the system; the additional size, weight and power required by said extra components are especially burdensome in airborne and space applications for fault-tolerant systems.

SUMMARY OF THE INVENTION

The invention discloses a distributed signal processing system (DSPS) that is fault-tolerant, self-repairable and reconfigurable. Said system is comprised of a plurality of elements which include a signal processor (SP), a mass memory (MM), and an input-output controller (IOC). Said elements are interconnected by at least one bus forming the system, and they are controlled by a fault-tolerant distributed operating system (DOS). The invention provides a new and improved fault-tolerant distributed signal processing system by the automatic substitution of spare sub-system elements without the need for special hardware switching elements which themselves would be a source of single-point failures within the system. In addition, a distributed method of bus arbitration is provided in each element which eliminates the need for a central bus arbiter. Said method of bus arbitration is based on the decoding of a composite of element arbitration codes generated by each element.

A new and improved fault-tolerant signal processing system is disclosed using distributed architecture in which many identical, interconnected, sub-system elements share the overall processing tasks. This approach permits the signal processor to be sufficiently general to address many applications by varying the number of sub-system elements. In many radar signal processing applications, the nature of the tasks to be performed require the interconnection of more than one distributed signal processing system. This invention also discloses the interconnection of multiple systems to form a distributed signal processing system network.

The invention discloses a method to achieve fault-tolerance through simple element reconfiguration. Faults are detected by a combination of fault detection hardware and the distributed operating system (DOS) software. Fault detection hardware comprising parity checks and watchdog timers are included in all bus interfaces. The signal processor has checks for invalid or privileged operation codes along with checks for out-of-range memory addresses and an extensive set of microprogrammed diagnostic routines. The mass memory, which may be implemented with MOS RAM technology, has three spare bits in each memory word to provide for internal memory reconfiguration upon a detected bit failure. The DOS software may provide status polling of the sub-system elements and spares rotation of the elements. When a faulty element is discovered, the DOS reconfigures the system removing the faulty element from service and reassigns tasks to a spare element.

Each element in a system has an address based on its physical location in the hardware system; however, after a power-on initialization procedure, the DOS can change the address of any said element by assigning it a "virtual address". This feature of the distributed signal processing system provides means for the reconfiguration process.

The distributed operating system provides the means for controlling, managing and reconfiguring the plurality of elements. It comprises a local level segment, DOS-0, for performing individual signal processor management and fault monitoring, and a system level segment, DOS-1, for performing system tasks management, fault monitoring and reconfiguration. The local level segment, DOS-0, comprises read-only memories (ROMs) that are redundantly distributed within each signal processor. The system level segment DOS-1 is the executive program located in RAM memory of one or more signal processors after a power-on initialization sequence.

Special OPERATE instructions are disclosed within the control unit of the signal processor element. Said OPERATE instructions provide the means for communicating between an applications program and the local level segment, DOS-0, of the distributed operating system, for performing signal processing operations of multiplication of two complex matrices, for performing target detection and clutter map update, and for managing privileged signal processor resources. The speed and efficiency of said signal processing instructions is provided by the means for performing multiplication and addition within one clock cycle in the arithmetic unit of the signal processor element.

In this invention, a method is disclosed of determining which signal processor in a system will become the executive and thereby contain DOS-1 when power is initially applied. Each signal processor performs self-test programs to verify that no faults exist. Upon successful completion of said self-test programs, a "ready and executive request" message is sent from the signal processor to a mass memory with a particular address. However, if two or more signal processors attempt to use the bus simultaneously to send said message, a method of bus arbitration occurs. The signal processor with the highest priority address wins the arbitration and uses the bus first. The first signal processor to request the executive in the specific mass memory addressed causes the address of said mass memory to be changed resulting in the other signal processors sending a message to an address that no longer exists. Then the other signal processors enter an idle state until assigned a task to perform by the DOS-1 executive program.

The present invention provides an improved fault-tolerant, self-repairable, distributed signal processing system based on the novel combinations of spare elements, redundant busses, virtual addresses of elements, distributed operating system, distributed bus arbitration apparatus and a multi-system network configuration.

BRIEF DESCRIPTION OF THE DRAWINGS

Other and further objects and advantages of the invention will become apparent in connection with the accompanying drawings wherein.

DESCRIPTION OF THE PREFERRED EMBODIMENT SYSTEM DESCRIPTION

Figure 1:
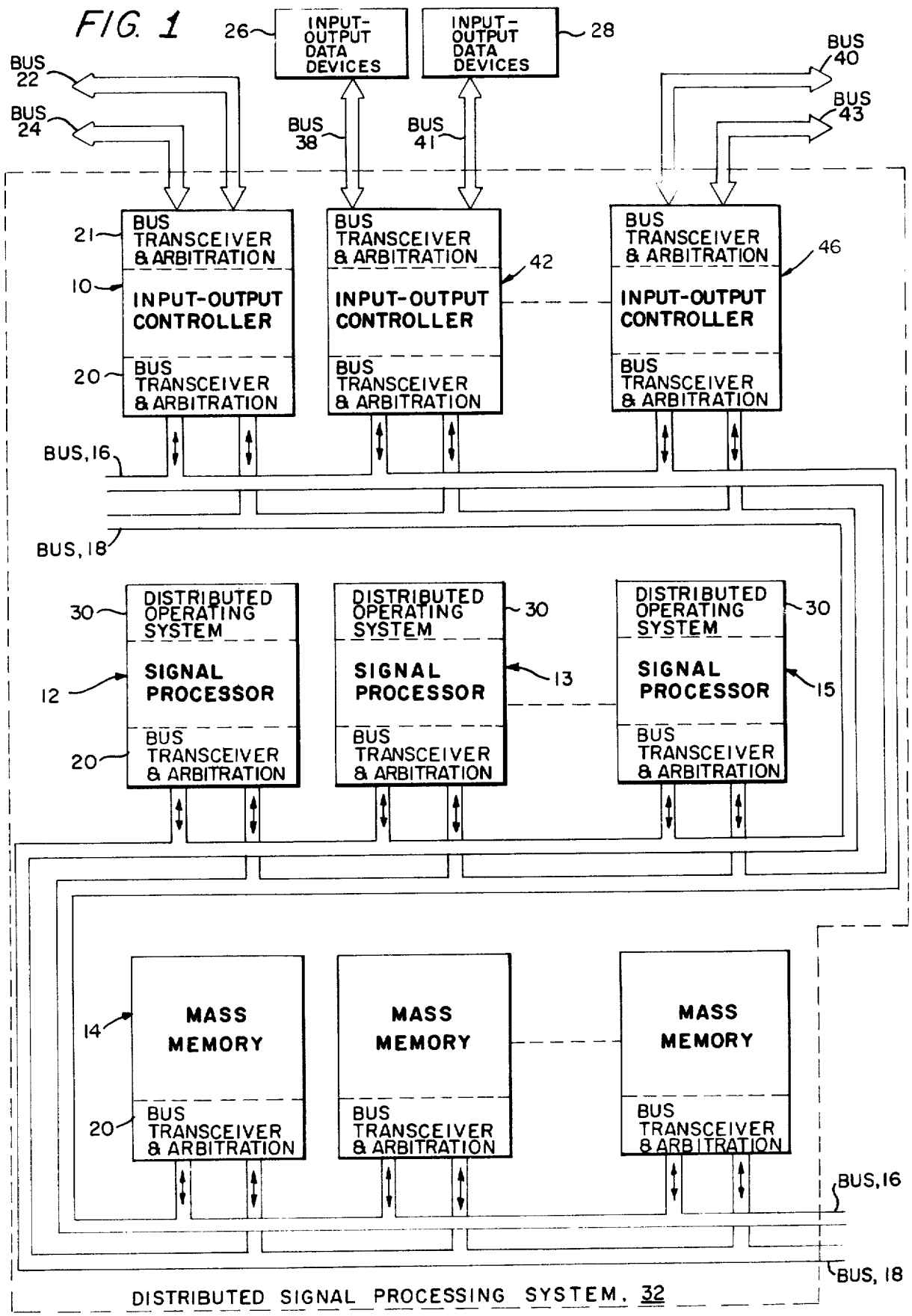
FIG. 1 is a functional block diagram of the invention comprising a distributed signal processing system.

Referring to FIG. 1, there is shown a block diagram of a distributed signal processing system (DSPS). The system includes a plurality of elements comprising identical input-output controllers (IOC) 10, signal processors (SP) 12 and mass memories (MM) 14. These said elements are interconnected by the dual redundant busses, bus 16 and bus 18 in a manner such that each element connects to each bus, and if one bus is removed from operation, the DSPS system remains operational. Although not shown in FIG. 1, power is supplied to each element in a system by a dual-redundant power distribution system in accordance with well-known practices.

Each of the elements 10, 12 and 14 in FIG. 1 contain bus transceivers 20 which provide means for communication among the elements, and arbitration 20 apparatus which provides means for determining which element will gain access to a bus when there are simultaneous requests from other elements to use said bus. A distributed method of arbitration eliminates the need for a central bus arbiter or daisy chain bus request line and avoids the single-point failure modes inherent in such prior arbitration art.

Figure 2:
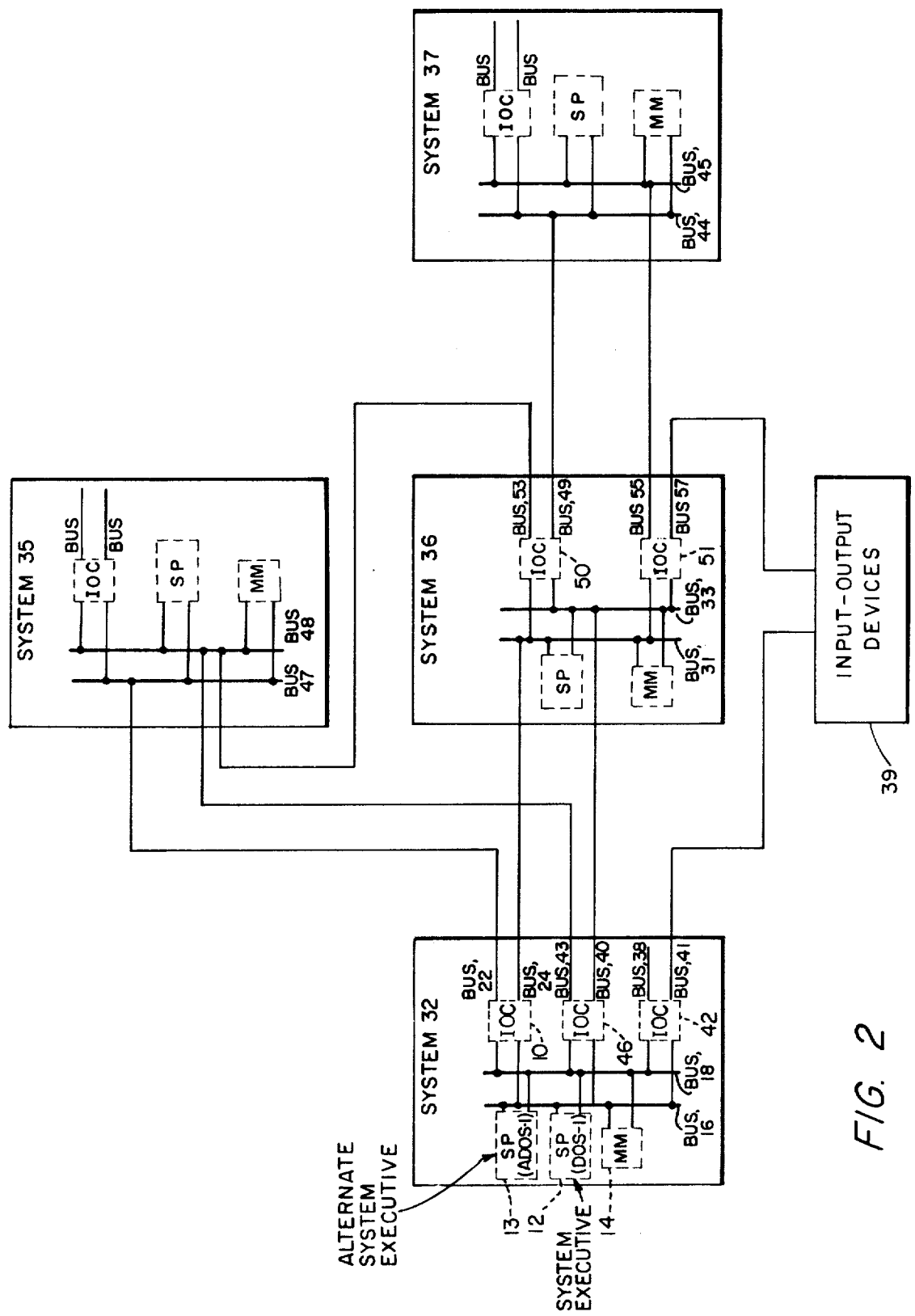
FIG. 2 is a functional block diagram of the invention illustrating a distributed signal processing system network, and it identifies the location of the system executive program, DOS-1 and the alternate executive, ADOS-1, in said network.

The input-output controller element 10, as shown in FIG. 1, contains two additional busses, bus 22 and bus 24 and associated bus transceivers and arbitration 21 circuits in addition to bus 16 and bus 18, which provide the means to connect the system to input-output data devices 26 and 28, as illustrated by bus 38 and bus 41. In addition, bus 22 and bus 24 may be used to provide bus extension means for interconnecting multiple systems (as shown in FIG. 2) to form a DSPS network capable of solving more complex radar signal processing applications.

All the elements in the system in FIG. 1 are controlled by a distributed operating system (DOS) 30 located in signal processors 12, 13 and 15 as illustrated in FIG. 1, which is responsible for the management of all the DSPS elements so as to permit the orderly operation of assigned tasks. In accordance with the distributed nature of the signal processing system, the operating system is also organized as a distributed function with local control and management of a signal processor resources being performed by a local level segment, DOS-0, redundantly resident in ROM in every signal processor 12, 13 and 15. The high level system control of the entire distributed signal processing system is performed by the system level segment, DOS-1, which is stored in the mass memory 14 and operationally resides in the first signal processor 12, for example, assigned to be the executive. To insure fault-tolerance, a second signal processor 13 is assigned to monitor said DOS-1 executive, with an alternate executive (ADOS-1) as illustrated in system 32 shown in FIG. 2. If DOS-1 fails, ADOS-1 takes over and assigns its own executive monitoring task to another signal processor.

The distributed signal processing elements, as shown in FIG. 1, interconnected by at least one bus is called a system. The number of systems to be interconnected is determined by the signal processing requirements for a particular application. FIG. 2 shows the interconnections of an exemplary four (4) system signal processing network although other configurations are equally feasible. Each system is comprised of at least one of each of the following elements: input-output controller (IOC), signal processor (SP) and mass memory (MM). System 32 is redundantly connected to system 36 by means of bus 24 from IOC 10 connecting to bus 31 in system 36, and bus 40 of IOC 46 connecting to bus 33 in system 36. System 32 is also redundantly connected to system 35 by means of bus 22 from IOC 10 connecting to bus 47 in system 35, and bus 43 of IOC 46 connecting to bus 48 in system 35. Another IOC 42 in system 32 provides the means for connecting to input-output peripheral devices 39. Communication with said input-output devices 39 is provided also by bus 57 from IOC 51 in system 36.

System 36 is redundantly connected to system 37 via bus 49 from IOC 50 connecting to bus 44 in system 37 and bus 55 from IOC 51 connecting to bus 45 in system 37. System 36 also provides a communication path to system 35 via IOC 50 and bus 53 connecting to bus 48 in system 35.

In order to maintain a fault-tolerant capability in a network configuration, as illustrated in FIG. 2, there are at least two communication paths to each system via separate IOC's. Generally, this requires use of one more IOC in a complete multi-system network than the total number of systems. For example, there are four systems in the network shown in FIG. 2 and five IOC's 10, 42, 46, 50 and 51 are used to interconnect said systems. The management of communications between systems and the management of the multi-system network is under the control of a distributed operating system; the system level segment, DOS-1, assumes the role of the system executive or general manager for the network and it is located in system 32, as shown in FIG. 2.

Figure 3:
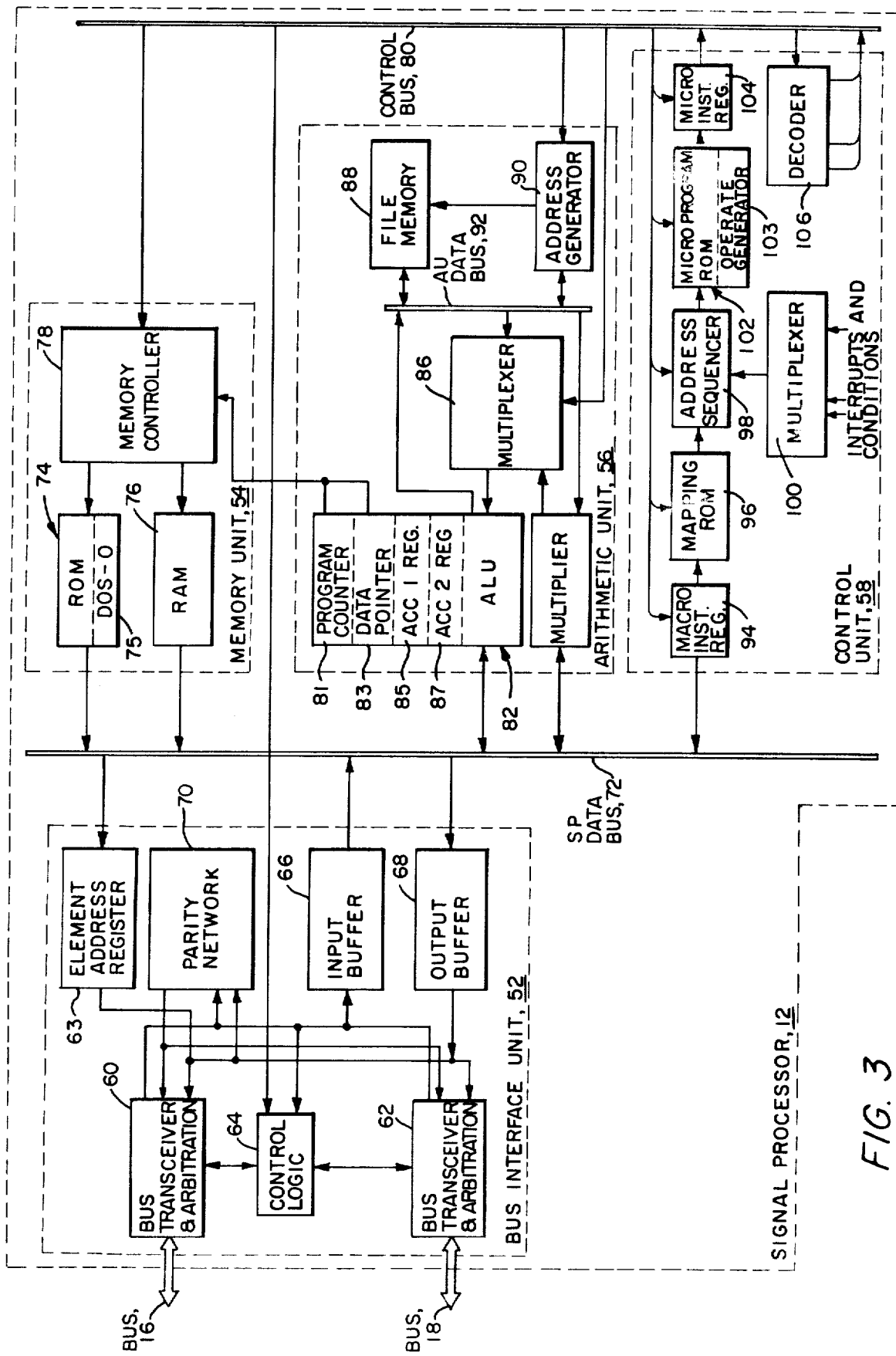
FIG. 3 is a functional block diagram of the signal processor element of a distributed signal processing system.
Figure 4:
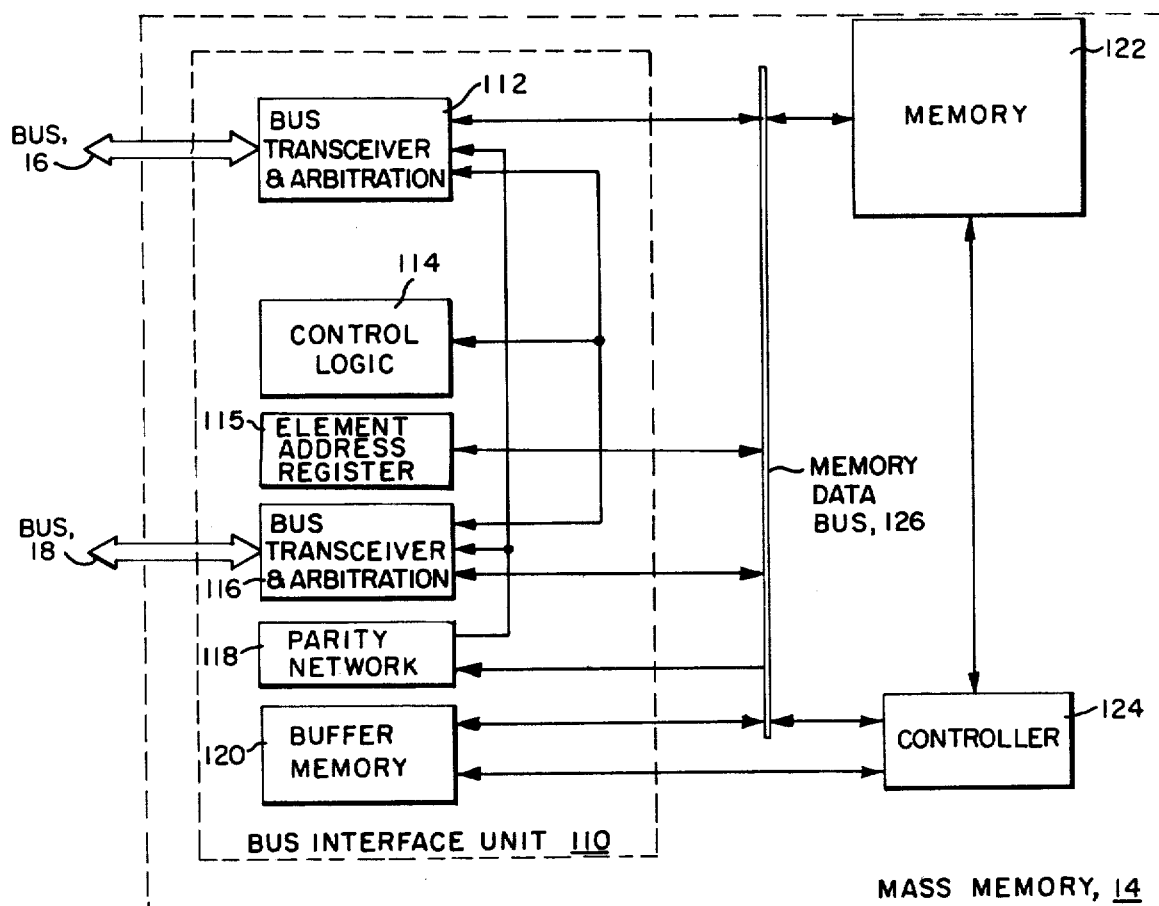
FIG. 4 is a functional block diagram of the mass memory element of a distributed signal processing system.
Figure 5:
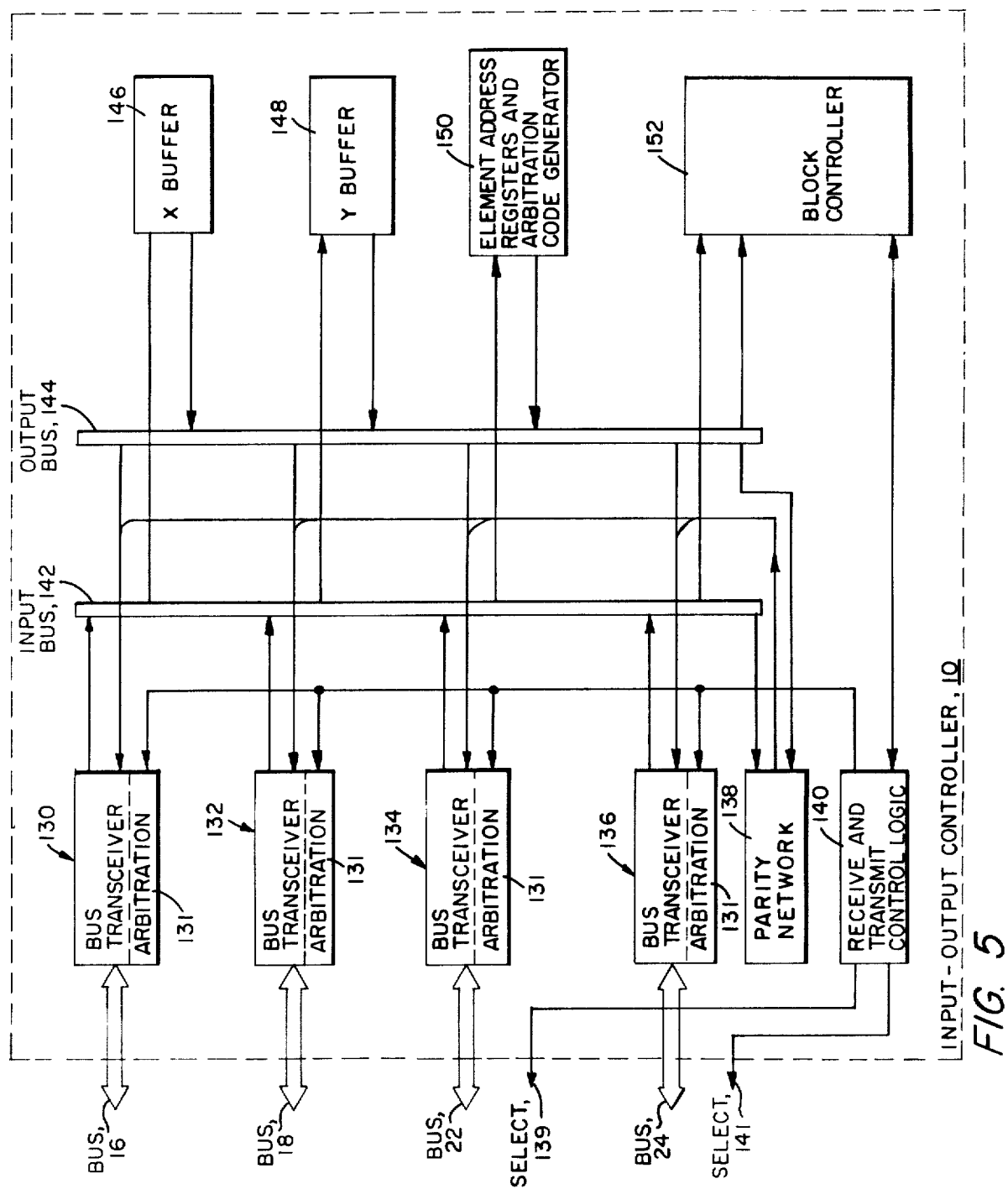
FIG. 5 is a functional block diagram of the input-output controller element of a distributed signal processing system.

The operation and use of the DSPS illustrated in FIG. 1 and therein the method of the invention are as follows:

Whenever power is applied to a distributed signal processing system 32 or after a reset operation, the DOS-0 segment in each of the signal processors 12 performs self-test programs. If the results of the execution of said programs in a signal processor are successful, it attempts to use the bus. If two signal processors attempt to use the bus simultaneously, then the method of bus arbitration occurs, as described in the input-output controller section, to determine which signal processor gets the bus. Initially, each element has a "socket address" based on the element's physical location in said system, and priority goes to the element with the highest numerical address. However, once a signal processor 12, 13 or 15 gets assigned the task to be the executive and thereby contains DOS-1, the executive can change the address of any element and assign a "virtual address" which affects the elements importance or priority when arbitration occurs. This method of changing element addresses also provides the means for reconfiguration when a faulty element is detected and replaced by a spare element assigned the address of the faulty element. Tasks communicate with other tasks, input-output ports, and the executive by means of said "virtual address" so that task software or system configuration information is not dependent on the particular element task assignments. The element address register for each element which stores the "virtual address" is shown in FIGS. 3, 4 and 5.

When a first signal processor occupies the bus, it sends a message to a mass memory 14 with a specific element address. Upon receipt of the first message from a signal processor, the mass memory changes its said element address so that when the other signal processors complete their self-test programs and attempt to occupy the bus to send out a message, there will be no element with that specific address to receive said message so the signal processors will simply enter an idle mode. The mass memory, however, proceeds to load the executive program, DOS-1, into the signal processor element that sent the first "ready" message. The executive program then proceeds to poll the other elements within the system determining which ones are available, and it proceeds to assign work tasks to the various elements. Each element assigned a task proceeds to load its RAM memory with task programs from the mass memory 14. This procedure permits the system to start-up in a degraded mode of operation with a minimum of one operational signal processor, one mass memory and one bus.

Once the DSPS begins to function, the system fault-tolerance is achieved through a combination of fault detection hardware and the DOS software. The method of fault-tolerance is such that when a failure occurs and it is discovered, self-repair is performed by removal of the faulty element from service and replacement with a spare element without any special switching or reconfiguration hardware. The DOS-1 executive program located in a signal processor RAM 76, as shown in FIG. 3, provides the means for self-repair in a manner whereby the addition or deletion of the elements in a system can be accomplished without necessitating any redesign within the system. The individual hardware fault detection methods are conventional, consisting of microprogrammed diagnostics, parity checks and watchdog timers. For instance, if a transmitting element requires excessive time to arbitrate for use of a bus or to transmit information, the transmission is suspended and fault flags are set in a status register, not shown but located in each element of a system. Other detection hardware checks for invalid or privileged operation codes and out-of-range memory addresses.

Two fault detection methods are implemented in the DOS-1 executive hardware, such as status polling and spares rotation. DOS-1 polls all active elements with a system status request message at a programmable rate. The format of said message is listed in Table 1. No response or an I/O status word response with a fault reply causes DOS-1 to reconfigure the DSPS system by removing the faulty element from service and replacing it with a spare element. Table 2 lists the I/O status word format. All possible element addresses are polled to discover newly inserted elements; this feature allows an element to be repaired without system shutdown. Spare elements may be assigned a self-test task to thoroughly test all functions. By rotating spares and active elements periodically, DOS-1 insures that all elements execute self-test tasks which provides a means for detecting more subtle faults.

Signal Processor

Referring now to FIG. 3, the signal processor (SP) 12 element of the distributed signal processing system is illustrated; it is comprised of a bus interface unit 52, memory unit 54, arithmetic unit 56 and control unit 58 interconnected by a SP data bus 72 and control bus 80. The signal processor operates as a parallel, 16 bit, micro-programmed minicomputer implemented with special operate instructions for efficient processing of real-time data.

The bus interface unit 52 shown in FIG. 3 contains dual ports represented by the bus transceiver 60 and the bus transceiver 62. These I/O ports provide redundant paths for loading program instructions and data into the memory unit 54. The transceiver circuits 60 and 62 transmit data to and receive data from the other elements in a DSPS by means of the control logic 64 and bus 16 or bus 18, each of which contains 16 data lines, a parity line and four control lines in an open collector wire-ORed configuration. The element address register 63 provides the means for storing the address of a signal processor element and it also permits the changing of an element's address when a faulty element is detected. The parity network 70 generates odd parity on data being transmitted and checks the parity line for data being received. Data is transmitted and received in blocks of up to 256 words by the control logic 64. When a block of data is received from bus 16 or bus 18, it is placed in the input buffer 66 until memory unit 54 is ready to accept said data. When a block of data is to be transmitted, it is taken out of the memory unit 54 and put into the output buffer 68 via SP data bus 72. Since several transceivers in various elements may attempt to use bus 16 or bus 18 at the same time, a method of arbitration 60 is employed to decide which transmitter will control the bus. Each transmitting element attached to a bus generates a unique arbitration code which determines the transmitter priority on the bus. Lower priority transmitters drop off the bus until only the highest priority element remains. This method of arbitration will be further described in the present invention in the section on the input-output controller element.

The memory unit in FIG. 3 comprises a read-only memory (ROM) 74, a random access memory (RAM) 76 and a memory controller 78. Memory location addresses are sent to the memory controller 78 from the arithmetic unit 56 for the purpose of either reading instructions or data from the ROM 74 or RAM 76 or to write instructions or data into the RAM 76. The ROM 74, of conventional design organized in 4096 words of 16 bits each, contains the DOS-0 75 segment of the Distributed Operating System which provides the local control and management of the signal processor 12, such as power-on initialization sequence, fault monitoring, interrupt loading, illegal operations, I/O service requests and providing status information to the system level executive segment of the distributed operating system, DOS-1, located in the signal processor that assumes the role of the system manager or executive. The RAM 76 is constructed in an exemplary embodiment with 16K dynamic MOS RAM's and 16 bit word length, well known in the art, the details of which are not necessary to understand this invention.

The control unit 58 illustrated in FIG. 3 is of conventional microprogram design, well known in the art, comprising a macro-instruction register 94, mapping ROM 96, address sequencer 98, multiplexer 100, micro-program ROM 102, micro-instruction register 104 and decoder 106. When a macro-instruction is loaded into the macro-instruction register 94 via the SP data bus 72, a sequence of one or more micro-instructions occurs in order to implement the said micro-instructions. The sequencing of micro-instructions from the microprogram ROM 102 is controlled by the mapping ROM 96 and address sequencer 98 and multiplexer 100. The individual micro-instructions are read out of the micro-program ROM 102, which is organized in an exemplary embodiment with 2048 words of 80 bits each, and they are loaded into the micro-instruction register 104. The output bits of the micro-instruction register 104 are distributed over the control bus 80 within the signal processor 12 to perform the control functions or micro-operations necessary to cause the implementation of the said macro-instruction. The decoder 106 provides the means for another level of decoding of micro-instruction bits for generating additional micro-operations.

There are two types of macro-instruction formats, as listed in Table 3, comprising a Basic Address Mode (BAM) and an Extended Address Mode (EAM). The BAM forms an effective address of the operand by using the eight least significant bits of the macro-instruction format as a signed integer displacement to be combined with the contents of one or more registers. The EAM forms an effective address by using the contents of the register specified in the R1 field of said format.

The instructions implemented by the microprogrammed control unit 58 shown in FIG. 3 comprise a conventional data processing instruction set listed in Table 4 and OPERATE instructions listed in Table 5. The OPERATE instructions perform control operations and customized signal processing operations, and they are implemented by the operate generator 103 of the micro-program ROM 102. There are application program OPERATE instructions, system programming OPERATE instructions and special purpose signal processing OPERATE instructions.

The application program OPERATE instructions provide communication between said application program and the local segment of the distributed operating system, DOS-0. They comprise instructions such as the following: return from subroutine, interrupt enable/disable, resume operations, read realtime clock, and system call. The system call instruction allows a design programmer to request DOS-0 to perform a specific service function as listed in Table 6.

The system programming OPERATE instructions manipulate and manage the signal processor resources, and the majority of said instructions are privileged, as indicated in Table 5, in that they may only be executed by programs initiated with a privileged program status word, as shown in Table 7. Any attempt to execute a privileged instruction by an unprivileged program results in an error interrupt and program termination. The logic diagnostic test and the memory diagnostic test instructions are examples of system programming OPERATE instructions that are not privileged.

The special purpose signal processing OPERATE instructions comprise, for example, the matrix multiply instruction and the detection and map update instruction which are particularly efficient for signal processing of doppler radar data using a clutter map to establish detection thresholds independently for each radar range, azimuth and doppler cell. Other special purpose OPERATE instructions, not listed in Table 5, perform fast fourier transform (FFT) and vector operations. For other applications of a distributed signal processing system, special purpose OPERATE instructions may be readily implemented within the micro-programmed control unit.

The arithmetic unit 56 is shown in FIG. 3 and comprises an arithmetic logic unit (ALU) 82, multiplier 84, multiplexer 86, file memory 88, address generator 90 and AU data bus 92. The ALU 82 performs arithmetic and logical operations on operands received from various sources such as the memory unit 54, the file memory 88 or the multiplier 84. The ALU 82 contains the following four registers: the program counter 81 determines the address of the next macro-instruction from the memory unit 54; the data pointer 83 determines the address of where data to be operated on is located; the ACC 1 register 85 and the ACC 2 register 87 are working accumulators for iterative arithmetic operations or they function as temporary holding registers for intermediate operands. The multiplier 84 performs a high speed 16 bit by 16 bit multiply in one processor clock cycle time.

The multiplexer 86 provides the means for data transfers to be accomplished from the multiplier 84 to the ALU 82 in order that addition within the ALU occurs during the same processor clock cycle time as when multiplication occurs in the multiplier 84. Typically, the previous product formed by the multiplier is transferred to the ALU 82 to be added with previous accumulated products in said ALU; at the same time, data from the file memory 88 and the memory unit 54 are multiplied in the multiplier 84 during the said clock cycle time. This method enables the computations on data by the special signal processing OPERATE instructions to be performed faster than otherwise conventional methods. The multiplexer 86 also provides a direct path for data transfer from the file memory 88 to the ALU 82.

The address generator 90 receives information from the control unit 58 for determining the locations in file memory 88 to be used during a particular macro-instruction execution. The AU data bus 92 contains 16 lines implemented with conventional I/O tri-state devices, and it provides efficient means for transferring data or addresses to the file memory 88, address generator 90, ALU 82, multiplier 84 or multiplexer 86.

The file memory 88 in the arithmetic unit 56 provides the means for storing eight register sets with each set containing eight words. These registers are architectually all general purpose accumulators but have specialized usage as determined by the micro-code of the control unit 58 comprising such functions as the program counter, stack pointer, accumulators and index register. Each register set has an associated program status word (PSW) which contains information pertinent to the program executing with said register set. The PSW comprises the 8 least significant bits of a word in said file memory and contains information as listed in Table 7. The remainder of the file memory is used for conventional internal signal processor housekeeping functions and scratch pad memory for the signal processing OPERATE instructions.

The interrelationship of the units within the signal processor 12 is further demonstrated as follows: The program counter in the ALU 82 determines the address of where to fetch the next macro-instruction from the ROM 74 or RAM 76 in the memory unit 54. The instruction is transferred via SP Data Bus 72 to the macro-instruction register 94 in the control unit 58. The mapping ROM 96 determines a starting address or address mode which accesses the microprogram ROM 102 obtaining micro-instructions. An effective address may then be calculated via the file memory 88 and ALU 82. The effective address is stored in the ALU data pointer 82 for accessing data in the memory unit 54 needed for execution of the macro-instruction.

Mass Memory

The mass memory (MM) 14 element of the distributed signal processing system is shown in FIG. 4 comprising a bus interface unit 110, memory 122, controller 124 and memory data bus 126. Within the bus interface unit 110, there are the bus transceiver and arbitration 112 and 116, control logic 114, element address register 115 and parity network 118 which are identical to the equivalent functional items in the bus interface unit 52 of the signal processor 12 in FIG. 3. The bus interface unit 110 also contains a buffer memory 120 which takes the place of the input and output buffers 66 and 68 of the signal processor 12 in FIG. 3. All information written into or read out of the mass memory passes through the buffer memory 120 via the memory data bus 126. The buffer memory 120 is a factor of 5 times faster than the memory 122 which enables it to receive and transmit blocks of information at the bus 16 and 18 data rates. All information transfers within the mass memory 14 occur over the memory data bus 126 which comprises 16 lines implemented with conventional bidirectional tri-state devices. In the preferred embodiment, the buffer memory is organized with a minimum of 4096 words of 16 bits each. Information is transferred in and out of the memory 122 via the memory data bus 126 under the control of the controller 124.

The memory 122 in the preferred embodiment is organized as eight segments of 16K words each for a total of 128K words of 19 bits each. Three spare bits are provided in each word for increased reliability. Data is moved in and out of the memory 122 in pages of 240 words. Data is transmitted in and out of the mass memory 14 in 256 word single message packets. Header information consisting of up to 16 words is added to the 240 word pages by the controller 124 for outgoing information. When data comes into the mass memory 14, the header information within the packet is interpreted by the controller 124 to determine if a normal fetch or store operation shall occur or whether a control action is being requested such as a status request, reset and power-on, or power-off. A packet of data may consist of a maximum of 256 words, but it may also be as little as one word of header information. The mass memory 14 functions as a passive element in the distributed signal processing system because it does not initiate action but simply responds to messages from the other elements in the system.

Input-Output Controller

FIG. 5 illustrates an input-output controller (IOC) 10 element of the distributed signal processing system. The IOC functions as a message center in said system with routing, control and error checking capabilities. There are four distinct I/O bus transceiver ports in each IOC providing the means for connecting to the bus 16, bus 18, bus 22 or bus 24. Each of said busses contains 16 data lines, a parity line, and four control lines in an open collector wire ORed configuration. Each bus connects to one of four identical bus transceiver circuits 130, 132, 134 and 136 which are the same as the bus transceiver circuits described hereinbefore for the other system elements.

The bus transceivers 130 and 132 in FIG. 5 are always connected to the system busses 16 and 18 in which the IOC resides, as shown in FIG. 1. In a multi-system network, as illustrated in FIG. 2, bus transceivers in IOC 10 operate in a bus extended mode set up by the block controller 152 whereby busses 22 and 24 in system 32 connect to bus 47 in system 35 and bus 31 in system 36 respectfully. When an IOC is used to transmit information to and from peripheral I/O data devices, it operates in a dynamic I/O mode set up by the block controller 152, as illustrated in FIG. 2 by IOC 42 in system 32. The select 139 and select 141 signal outputs shown in FIG. 5 each contain four bit codes for selecting one of up to 16 peripheral devices connected to a bus. The conventional parity network 138 checks the parity line for the data received by an IOC and generates parity for data transmitted by an IOC.

The IOC in FIG. 5 has two buffers 146 and 148 for simultaneous transmit and receive of entire 256 word blocks of data through separate bus ports. The X buffer 146 can be accepting data from one bus under the control of the receive control logic 140 while the transmit control logic 140 is sending data out on another bus.

The input bus 142 and the output bus 144 in FIG. 5 provide the paths for the transfer of data within the IOC 10.

The block controller 152 in FIG. 5 generates the control signals for the receive and transmit control logic 140, and it services control and status messages, as listed in Tables 1, 2 and 8, for the distributed operating system executive, DOS-1, located in a signal, processor 12 element as shown in FIG. 2. The block controller 152 sets up an IOC in one of four modes as directed by the executive with an IOC control word, as listed in Table 8. The IOC control word enters the IOC via bus transceiver 130 or bus transceiver 132 and is transferred to the block controller by the input bus 142. Two of the four modes are simply OFF and SPARE; the other two functional modes consist of configuring the IOC to function as a bus extender for multi-system network operation and configuring the IOC to function as a peripheral data device controller. The IOC cannot function in multi-modes simultaneously. In all modes of operation, the IOC block controller 152 must respond to "status request" messages, listed in Table 1, from an executive signal processor by formatting and sending a "status return" message. Said "status return" message comprises several words, not shown, which contain information such as the number of errors since last polling, the type of error, the current mode of operation, the I/O port selected, the current bus selected and the virtual address of the IOC.

As described hereinbefore for the other elements, each element in a distributed signal processing system has a distinct socket address, based on the physical location of the element hardware, which is loaded into the element address registers 150 shown in FIG. 5 when power is turned on; however, every element can be assigned by the executive a different address referred to as the "virtual address" which replaces said socket address. This method of changing element addresses provides the means for reconfiguration when a faulty element is detected and replaced by a spare element. However, an IOC element has two address registers compared to one in the other elements. One address register is for the operation of bus transceivers 130 and 132 and the second address register is for the operation of the other two bus transceivers 134 and 136.

Figure 6:
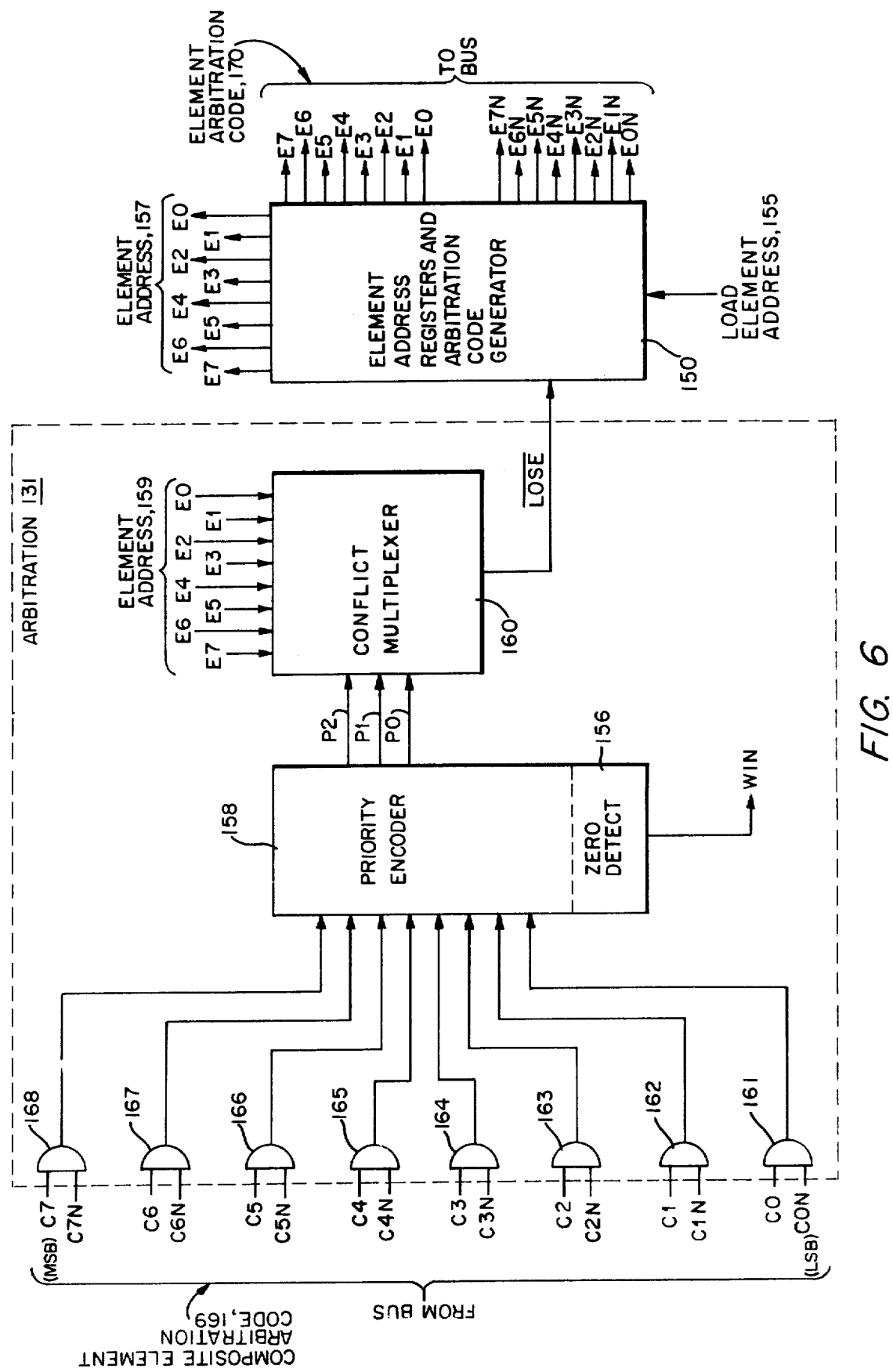
FIG. 6 is a functional block diagram of the distributed bus arbitration apparatus incorporated in each element of a distributed signal processing system.

Whenever information must be transmitted out of an IOC 10 or any other element in a distributed signal processing system, the transmitting element must first obtain control of the bus. Each transmitting element within said system begins occupancy of a bus, such as bus 16 in FIG. 5, by outputting a unique element arbitration code 170 (as shown in FIG. 6) onto the open-collector wire-ORed bus. Said arbitration code is based on the address of the element requesting use of the bus. It consists of the eight bits of the element address (E0 through E7) plus the eight bits of the complement of the element address (E0N through E7N) for a total of 16 bits. If several elements attempt to use the bus at the same time, a method of arbitration is employed in each element to decide which element will use the bus.

The arbitration apparatus is shown in FIG. 6, and it is resident in each element of a distributed signal processing system. The element address registers and arbitration code generator 150 contains an eight bit address register or registers (two for an IOC) which along with a one-of-two decoding method permits up to 256 addresses to be arbitrated. It generates an eight bit element address 157 which has been loaded into it by the load element address 155 input and it generates the element arbitration code 170 described hereinbefore. In addition to the element address registers and arbitration code generator 150, the remainder of the arbitration logic 131 in an IOC 10, comprising the eight AND gates 161 to 168, priority encoder 158 and conflict multiplexer 160, performs decoding of the composite element arbitration code 169, and it is located within the bus transceiver interface, such as bus transceiver 130 in FIG. 5.

The element arbitration code 170 in FIG. 6, consisting of 16 bits from each element on a common bus, is detected on a bus as the composite element arbitration code 169 by the bus transceiver circuits (described previously), and a method of one-of-two decoding is implemented. Signals C0 through C7 and C0N through C7N represent the wire-ORed composite element arbitration code 169 for all the elements wanting to use the bus. Two logical ones at the input of AND gate 161 imply that an element with a one for that address bit and another element with a zero for that same address bit are on the bus, resulting in a priority conflict. However, if all the eight AND outputs connecting to the priority encoder 158 are low (logical zero), there is no conflict because only one element arbitration code is on the bus and arbitration has been won, causing the WIN signal to be generated. The WIN signal is generated by the zero detect 156 section of the priority encoder 158 allowing the element requesting the bus to occupy it and to proceed with a transmission.

If there is a conflict due to two or more elements wanting to occupy the bus simultaneously, then the priority encoder 158 generates a 3 bit code on signal lines P0, P1 and P2 in FIG. 6 which corresponds to the most significant element address bit in which a conflict exists as determined by the inputs to one of the eight AND gates 161 to 168. The conflict multiplexer 160 receives said 3 bit code and looks up the bits of its element address E0 through E7 159. If the particular bit in one of the eight address bit lines specified by the 3 bit code from the priority encoder 158 is zero, then the conflict multiplexer 160 generates the LOSE signal signifying that this element has lost arbitration. The LOSE signal connects to the element address and arbitration code generator 150 and causes the element's arbitration code to be removed from the bus; this occurs in all elements determined to have the same address bit conflict. This procedure of detecting address bit conflicts using the element arbitration code repeats itself until only the highest priority element is left on the bus. The element with the highest numerical address always gets priority to use the bus.

TABLE 1

System Message Format

| | |
|---|---|
| Headers (16 bits) | 1–8 words |
| Body Word Count | 1 word |
| Message Body | 0–254 words |

Header Format:

| Bit No. | 15 — 10 | 9 — 4 | 3 — 0 |
|---|---|---|---|
| | Destination Address | Source Address | Message Code |
| | ←6→ | ←6→ | ←4→ |

| Message Code | Message Type |
|---|---|
| 0 | Data Messages — First Block |
| 1 | Data Messages — Middle Block |
| 2 | Data Messages — Last Block |
| 3 | Data Messages — Single Block |
| 4 | Returned Message |
| 5 | Page Fetch (MM) |
| 6 | Page Store (MM) |
| 7 | Status Return |
| 8 | Status Request |
| 9 | Error Message |
| 10 | Load Control Word (MM, IOC) |
| 11 | Bus Extender (IOC) |
| 12 | Load Virtual Address |
| 13 | Power On/Reset |
| 14 | Executive Message |
| 15 | Power Off |

TABLE 2

I/O Status Word Format

| RECEIVE WORD COUNT | RECEIVE STATUS | TRANSMIT STATUS | BUS |
|---|---|---|---|
| 15      8 | 7   5 | 4   1 | 0 |

| Bits | Status Field Definition | |
|---|---|---|
| 15–8 | Receive word count for last block received. Does not include the initial header word. | |
| 7–5 | Receive Status | Octal (Bits 7–0) |
| | 100 - Idle | 200 |
| | 110 - Parity Error on Bus 16 | 300 ⎤ no interrupt |
| | 101 - Parity Error on Bus 18 | 240 ⎦ |
| | 010 - Incomplete Block 16 | 100 |
| | 001 - Incomplete Block 18 | 040 |
| | 000 - Receiver Buffer Full | 000 |
| | All others - Illegal | |
| 4–1 | Transmit Status | Octal (Bits 7–0) |
| | 1111 - Transmit Triggered | 036 |
| | 1101 - Bus Busy | 032 |
| | 1011 - Arbitration Fault | 026 |
| | 1001 - Reply Fault | 022 |
| | 0111 - Receiver Busy | 016 |
| | 0101 - Parity Error | 012 |
| | 0011 - Timing Fault | 006 |
| | 0001 - Done | 002 |
| | 0000 - Idle | 000 |
| | All others - Illegal | |
| 0 | Last Transmit Bus | |
| | 0 - Bus 16 | |
| | 1 - Bus 18 | |

TABLE 3

Macro-instruction Format

Basic Address Mode (BAM)

| OP CODE | BAM | DISPLACEMENT |
|---|---|---|
| 15    11 | 10  8 | 7    0 |

Extended Address Mode (EAM)

| OP CODE | BAM | EAM | R1 | R2 |
|---|---|---|---|---|
| 15    11 | 10  8 | 7  6 | 5  3 | 2  0 |

Register Codes for R1 and R2

| | | | |
|---|---|---|---|
| 000 = P | | 100 = A | |
| 001 = S | | 101 = E | |
| 010 = B | | 110 = I | |
| 011 = X | | 111 = W | |

TABLE 4

Data Processing Instructions

| Mnemonic | Instruction |
|---|---|
| STS | Store Single-Word |
| STD | Store Double-Word |
| LDS | Load Single-Word |
| LDD | Load Double-Word |
| LDC | Load Complement |
| LDN | Load Negative |
| SWP | Swap |
| ADD | Add Single Precision |
| ADP | Add Double Precision |
| SUB | Subtract Single Precision |
| SDP | Subtract Double Precision |
| AND | Logical And |
| IOR | Logical Or Inclusive |
| XOR | Logical Or Exclusive |
| MPY | Multiply |
| DIV | Divide |
| JUMP | Jump Unconditional |
| JPZ | Jump if Positive or Zero |
| JNG | Jump if Negative |
| JEZ | Jump if Equal to Zero |
| JNZ | Jump if Not Equal to Zero |
| JOVF | Jump if Overflow Indicator Set |
| JSUB | Jump to Subroutine |
| SAD | Shift Arithmetic Double |
| ISEZ | Increment and Skip if Zero |
| DSEZ | Decrement and Skip if Zero |
| CSL | Compare and Skip if Less Than |
| CSE | Compare and Skip if Equal |
| ASZ | AND with Mask and Skip if Zero |
| OSF | OR with Mask and Skip if Full |
| RSP | Rotate Single Precision |

TABLE 5

Operate Instructions

| Mnemonic | Instruction |
|---|---|
| SELINS | Set Instruction Set |
| *SETVAD | Set Virtual Address (Reg A) |
| TRAP | Trap Subroutine Call |
| *DROP | Drop to Level 0 Register Stack |
| *TRACE | Trace Select (n; 4 = ON; 0 = OFF) |
| RETURN | Subroutine Return |
| SYSREQ | System Service Request (Reg A; nn = Request Number) |
| *SETCLK | Set Real Time Clock (Regs A,E) |
| INTERR | Interrupt Enable/Disable (n: 1 = E; 0 = D) |
| *WRITE | Write Command (Regs A,I,W) |
| *READ | Read Command (Regs I,W) |
| RESUME | Resume Interrupted Program |
| *SELBUS | Select Transmit Bus (0 = Bus A; 1 = Bus B) |
| *READR | Read Reset |
| *WRITER | Write Reset |
| *REQIOS | Request I/O Status (Reg A) |
| *CLOCK | Clock Interrupt (n: 1 = E, 0 = D) Enable/Disable |
| LOGSTST | Logic Diagnostic Tests |

TABLE 5-continued

Operate Instructions

| Mnemonic | Instruction |
| --- | --- |
| MEMTST | Memory Diagnostic Tests |
| *SENDIN | Send Interrupt Message |
| *STARTU | Start User Program (Regs X,A,E) |
| TRPRET | Return from Trap Routine |
| *SREADR | Scatter Read Real (Regs A,I,W) |
| *SREADC | Scatter Read Complex (regs A,I,W) |
| *RESTRA | Resume with Trace (n: 1 = ON, 0 = OFF) Selected |
| GETCLK | Read Real Time Clock (Regs A,E) |
| LWGTMX | Load Weighting Matrix (Regs A,I,W) (n: 0 = Real; 1 = Complex) |
| MXMULT | Matrix Multiply |
| DETMUP | Detection and Map Update |

*Privileged Instruction

TABLE 6

DOS-0 Service Function

| Request Number | Service Performed |
| --- | --- |
| 0 | Write a Message |
| 1 | Request a Message |
| 2 | Trace Request |
| 3 | Unsolicited Input Control Update |
| 4 | Clock Control Update |
| 5 | DOS-1 Task Control Request |
| 6 | Register User Fault |
| 7 | Data Recording Request |
| 8 | Update Recording Control Information |
| 9 | Modify CE Virtual Address |
| 10 | Delete a Write Request |
| 11 | Delete a Read Request |
| 12 | Enable Suspended Output Request |
| 13 | Enable Suspended Input Request |
| 14 | Request Direct Output |
| 15 | Read Real Time Clock (Double Word) |

TABLE 7

Program Status Word

| UNUSED | RS | OF | I | T | M | E |
| --- | --- | --- | --- | --- | --- | --- |
| 15 | 8 7 5 | 4 | 3 | 2 | 1 | 0 |

| Bits | Field Name | Description | Values |
| --- | --- | --- | --- |
| 7-5 | RS | Register Set Number | 0-7 |
| 4 | OF | Overflow Indicator | 0 - No overflow<br>1 - Overflow |
| 3 | I | Instruction Set No. | 0 - Set 0<br>1 - Set 1 |
| 2 | T | Trace Indicator | 0 - No Trace<br>1 - Trace |
| 1 | M | Program Mode | 0 - User (non-privileged)<br>1 - System (privileged) |
| 0 | E | *Interrupt Enable | 0 - Disabled<br>1 - Enabled |

*Interrupts include:
a. Output complete
b. Input pending
c. Clock interrupt
d. Trace interrupt

TABLE 8

IOC CONTROL WORD FROM THE EXECUTIVE (DOS-1)

Word 1:

| 15 14 | 13 12 | 11 10 | 9 8 7 6 5 4 3 2 1 0 |
| --- | --- | --- | --- |
| Mode | Xmit Bus | Receive Bus | Unused |

TABLE 8-continued

IOC CONTROL WORD FROM THE EXECUTIVE (DOS-1)

Mode:
00 - Off
01 - Spare
10 - Bus Extension - Requires Word 2 - Virtual Address
11 - Dynamic Input-Output - Peripheral Devices Xmit Bus:
Bit 13 0 - Bus 16, 1 - Bus 18
Bit 12 0 - Bus 22, 1 - Bus 24

Receive Bus:
Bit 11 0 - Bus 22 disabled, 1 - Bus 22 enabled
Bit 10 0 - Bus 24 disabled, 1 - Bus 24 disabled Word 2:
Virtual address of IOC as seen by bus for Bus Extension Mode in multi-system configuration.

DESCRIPTION OF AN ALTERNATE EMBODIMENT

Figure 7:
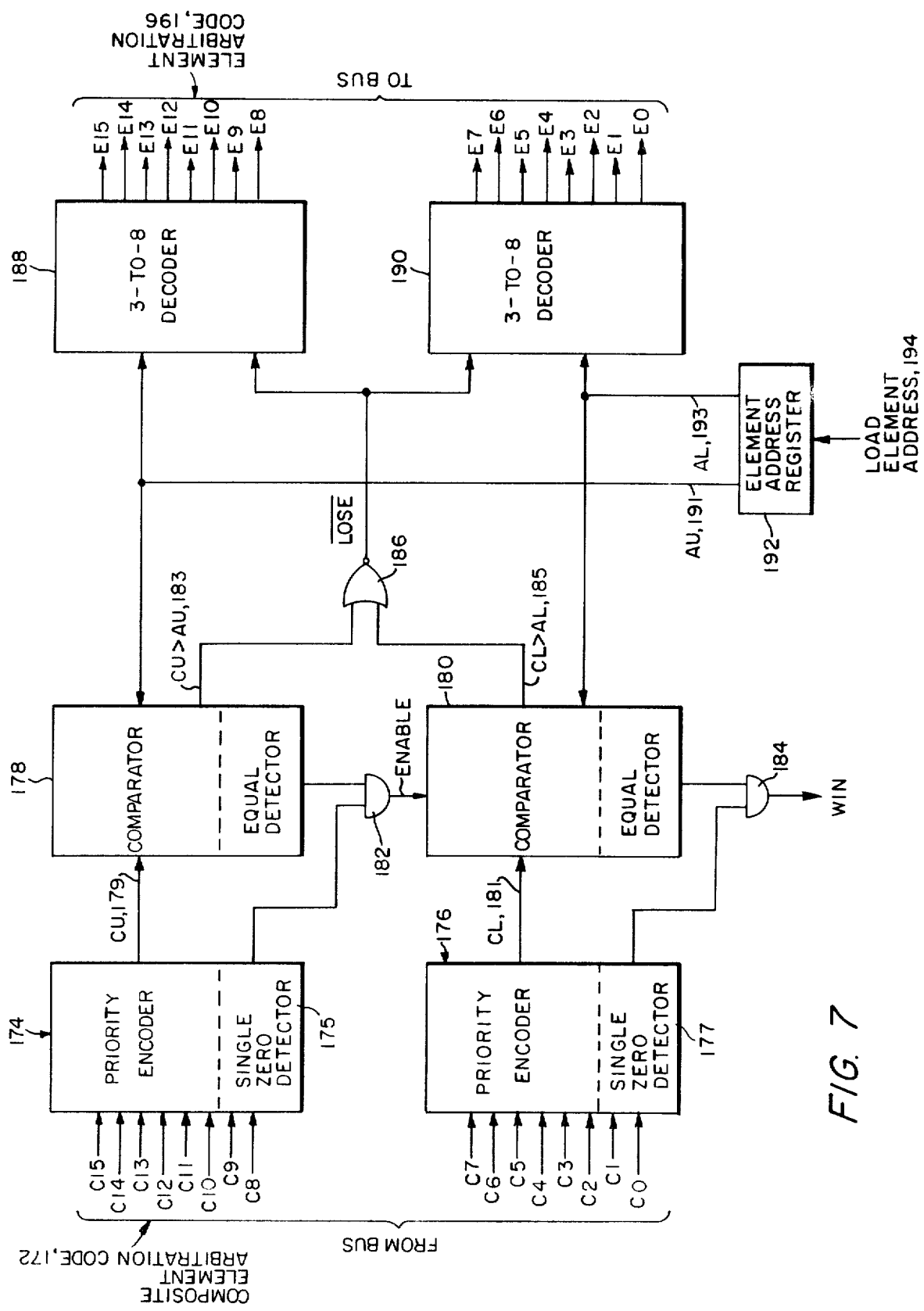
FIG. 7 is a functional block diagram of an alternate embodiment of a distributed bus arbitration apparatus incorporated in each element of a distributed signal processing system.

An alternate embodiment of a distributed bus arbitration apparatus for each element of a distributed signal processing system is illustrated in FIG. 7. Whereas, the preferred embodiment of a distributed bus arbitration apparatus shown in FIG. 6 provides arbitration capability for elements in a system with up to 256 addresses, the said alternate embodiment is limited to arbitration of elements with up to 64 addresses in addition to being a slower method of arbitration when arbitrating small numbers of elements.

Referring to FIG. 7, a 6 bit element address is loaded into element address register 192 prior to the start of arbitration. At the start of arbitration, the three most significant bits AU 191 of said element address register are decoded by 3-to-8 line decoder 188 to place a logical zero on one of the eight most significant element arbitration code lines E8 through E15. Similarly, the three least significant bits AL 193 of the element address are decoded by 3-to-8 line decoder 190 to place a logical zero on one of the eight least significant element arbitration code lines E0 through E7. The resulting 16 bit element arbitration code 196 is placed on the bus.

The eight most significant, composite, element arbitration code 172 lines, C8 through C15, from the bus are decoded by priority encoder 174 to produce a 3 bit number CU 179 representing the highest numbered element arbitration code line with a logical zero and the single zero detector 175 provides an indication if only a single line has a logic zero. Similarly, the eight least significant, composite, element arbitration code lines, C0 through C7, are decoded by priority encoder 176 to produce a 3 bit number CL 181 and the single zero detector 177 provides an indication if only a single line has a logic zero.

The three most significant bits of the encoded composite element arbitration code CU 179 and the element address AU 191 are compared by comparator 178 in FIG. 7 to detect the condition of equality between CU 179 and AU 191 and the condition that CU is greater than AU. If CU is greater than AU, another element has won arbitration and the LOSE signal is generated by NOR gate 186 which causes the element arbitration code 196 to be removed from the bus.

If only a single line of C8 through C15 has a logic zero and CU 179 equals AU 191, AND gate 182 enables comparator 180 to compare the encoded three least significant bits CL 181 of the composite element arbitration code from priority encoder 176 with the three least significant bits AL 193 of the element address register. If CL is greater than AL, another element has won arbitration and the LOSE signal is generated by NOR gate 186 which causes the element arbitration code 196 to be removed from the bus.

If only a single line of C0 through C7 has a logic zero and CL 181 equals AL 193, then the element has won arbitration and the WIN signal is produced by AND gate 184 permitting the element to proceed to use the bus.

This concludes the description of the embodiments of the invention described herein. However, numerous modifications and alterations will be obvious to one skilled in the art without departing from the spirit and scope of the invention. For example, programmable read-only memories (PROMS) could be used in place of read-only memories (ROMS) in the memory unit 54 and the control unit 56 of the signal processor 12. In the network configuration, shown in FIG. 2, each system could be comprised of a plurality of each type of element and system 37 could be connected directly to system 32 instead of communicating with system 32 through system 36. Accordingly, it is intended that this invention be not limited by the particular details of the embodiment illustrated herein except as defined by the appended claims.

What is claimed is:

1. In combination:
  a plurality of distributed signal processing systems;
  each of said systems comprising a plurality of elements including a signal processor, a mass memory, and an input-output controller, and a first bus means for interconnecting in common said plurality of elements;
  said input-output controller of each one of said systems comprising a second bus means for interconnecting a plurality of said systems by coupling said second bus means to said first bus means of another of said systems and for providing coupling to a plurality of input-output data devices; and
  each of said elements comprising one or more bus transceivers and arbitration means coupled to one of said first and second bus means for determining the one of a plurality of elements connected to said one of the first and second bus means that obtains first use of said connected one of the first and second bus means when more than one of said elements attempt to use one of said first and second bus means simultaneously.

2. The combination as recited in claim 1 wherein:
  each of said elements in each of said systems comprises means for detecting a faulty element.

3. The combination as recited in claim 2 wherein:
  at least one of said elements in said systems comprises means for performing self-repair of said systems when said faulty element is detected.

4. The combination as recited in claim 1 wherein:
  said first bus means for interconnecting said plurality of elements further comprises at least two identical buses for fault-tolerant operation capability.

5. The combination as recited in claim 1 wherein:
  said second bus means further comprises at least two identical buses for fault-tolerant operation capability.

6. The combination as recited in claim 1 wherein:
  said input-output controller comprises a plurality of operating modes which includes a bus extended mode for communicating with said interconnected systems.

7. The combination as recited in claim 6 wherein:
  said input-output controller further comprises a dynamic input-output mode for communicating with said input-output data devices.

8. In combination:
  a plurality of distributed signal processing systems;
  each of said systems comprising a plurality of elements including a signal processor, a mass memory and an input-output controller, and a first bus means for interconnecting in common said plurality of elements;
  said input-output controller of each one of said systems comprising a second bus means for interconnecting a plurality of said systems by coupling said second bus means to said first bus means of another of said systems and for providing coupling to a plurality of input-output data devices;
  each of said elements comprising one or more bus transceivers and arbitration means coupled to one of said first and second bus means for determining the one of a plurality of elements connected to said one of the first and second bus means that obtains first use of said connected one of the first and second bus means when more than one of said elements attempt to use one of said first and second bus means simultaneously; and
  said signal processor comprising operating means for managing processing tasks within said plurality of elements and systems.

9. The combination as recited in claim 8 wherein:
  each of said elements in each of said systems comprises means for detecting a faulty element.

10. The combination as recited in claim 9 wherein:
  at least one of said elements in said systems comprises means for performing self-repair of said systems when said faulty element is detected.

11. The combination as recited in claim 8 wherein:
  said first bus means for interconnecting said plurality of elements further comprises at least two identical buses for fault-tolerant operation capability.

12. The combination as recited in claim 8 wherein:
  said second bus means further comprises at least two identical buses for fault-tolerant operation capability.

13. A combination as recited in claim 8 wherein:
  said input-output controller comprises a plurality of operating modes which includes a bus extended mode for communicating with said interconnected systems.

14. The combination as recited in claim 13 wherein:
  said input-output controller further comprises a dynamic input-output mode for communicating with said input-output data devices.

15. In combination:
  a plurality of distributed signal processing systems;
  each of said systems comprising a plurality of elements including a plurality of signal processors, a plurality of mass memories and a plurality of input-output controllers for fault-tolerant operation capability, and a first bus means for interconnecting in common said plurality of elements;
  each one of said input-output controllers comprising a second bus means for interconnecting a plurality of said systems by coupling said second bus means of one of said systems to said first bus means of another of said systems and for providing coupling to a plurality of input-output data devices; and each of said elements comprising one or more bus transceivers and arbitration means coupled to one of said first and second bus means for determining the one of a plurality of elements connected to said one of the first and second bus means that obtains first use of said connected one of the first and second bus means when more than one of said elements attempt to use one of said first and second bus means simultaneously.

16. The combination as recited in claim 15 wherein: each of said elements in each of said systems comprises means for detecting a faulty element.

17. The combination as recited in claim 16 wherein: at least one of said elements in said systems comprises means for performing self-repair of said systems when said faulty element is detected.

18. The combination as recited in claim 15 wherein: said first bus means for interconnecting said plurality of elements further comprises at least two identical buses for fault-tolerant operation capability.

19. The combination as recited in claim 15 wherein: said second bus means further comprises at least two identical buses for fault-tolerant operation capability.

20. The combination as recited in claim 9 wherein: each of said input-output controllers comprises a plurality of operating modes which includes a bus extended mode for communicating with said interconnected systems.

21. The combination as recited in claim 20 wherein: each of said input-output controllers further comprises a dynamic input-output mode for communicating with said input-output data devices.

22. In combination:
a plurality of distributed signal processing systems;
each of said systems comprising a plurality of elements including a plurality of signal processors, a plurality of mass memories and a plurality of input-output controllers for fault-tolerant operation capability, and a first bus means for interconnecting in common said plurality of elements;
each one of said input-output controllers comprising a second bus means for interconnecting a plurality of said systems by coupling said second bus means of one of said systems to said first bus means of another of said systems and for providing coupling to a plurality of input-output data devices;
each of said elements comprising one or more bus transceivers and arbitration means coupled to one of said first and second bus means for determining the one of a plurality of elements connected to said one of the first and second bus means that obtains first use of said connected one of the first and second bus means when more than one of said elements attempt to use one of said first and second bus means simultaneously;
each of said elements comprising means for detecting a faulty element; and
self-repair means for correcting said faulty element by removing said faulty element from operating service and replacing said faulty element with a similar spare element.

23. The combination as recited in claim 22 wherein: said self-repair means comprises means for changing an address of a spare element to an address of said faulty element.

24. The combination as recited in claim 22 wherein: said first bus means for interconnecting said plurality of elements further comprises at least two identical buses for fault-tolerant operation capability.

25. The combination as recited in claim 22 wherein: said second bus means further comprises at least two identical buses for fault-tolerant operation capability.

26. The combination as recited in claim 22 wherein: each of said input-output controllers comprises a plurality of operating modes which includes a bus extended mode for communicating with said interconnected systems.

27. The combination as recited in claim 26 wherein: each of said input-output controllers further comprises a dynamic input-output mode for communicating with said input-output data devices.

28. In combination:
a plurality of distributed signal processing systems;
each of said systems comprising a plurality of elements including a plurality of signal processors, a plurality of mass memories and a plurality of input-output controllers for fault-tolerant operation capability, and a first bus means for interconnecting in common said plurality of elements;
each one of said input-output controllers comprising a second bus means for interconnecting a plurality of said systems and by coupling said second bus means of one of said systems to said first bus means of another of said systems and for providing coupling to a plurality of input-output data devices;
each of said elements comprising one or more bus transceivers and arbitration means coupled to one of said first and second bus means for determining the one of a plurality of elements connected to said one of the first and second bus means that obtains first use of said connected one of the first and second bus means when more than one of said elements attempt to use one of said first and second bus means simultaneously;
each of said elements comprising means for detecting a faulty element;
self-repair means comprising an element address register in each of said elements for removing said detected faulty element from operating service and replacing said faulty element with a spare element; and
said signal processors comprising distributed operating system means for managing processing tasks and self-repair means within said plurality of elements and systems.

29. The combination as recited in claim 28 wherein: said first bus means for interconnecting said plurality of elements further comprises redundant busses for fault-tolerant operation capability.

30. The combination as recited in claim 29 wherein: said second bus means for interconnecting a plurality of said systems further comprises at least two identical buses for fault-tolerant operation capability.

31. The combination as recited in claim 28 wherein: said plurality of elements, first bus means, second bus means and said self-repairing means in each of said distributed signal processing systems provide an operating capability in the presence of one or more faults in said systems.

32. The combination as recited in claim 28 wherein: said removal of said detected faulty element is accomplished by changing an address in said element address register of said spare element to an address of said faulty element.

33. The combination as recited in claim 28 wherein:
said self-repair means in each of said distributed signal processing systems performs said self-repair without element or system redesign by changing said element address in said element register causing an element to be added or deleted from said operating service.

34. The combination as recited in claim 28 wherein:
each of said input-output controllers comprises a plurality of operating modes which includes a bus extended mode for communicating with said interconnected systems.

35. The combination as recited in claim 34 wherein:
each of said input-output controllers further comprises a dynamic input-output mode for communicating with said input-output data devices.

36. In combination:
a plurality of distributed signal processing systems;
each of said systems comprising a plurality of elements including a plurality of signal processors, a plurality of mass memories and a plurality of input-output controllers for fault-tolerant operation capability, and a first bus means for interconnecting in common said plurality of elements;
each one of said input-output controllers comprising a second bus means for interconnecting a plurality of said systems by coupling said second bus means of one of said systems to said first bus means of another of said systems and for providing coupling of a plurality of input-output data devices;
each of said elements comprising one or more bus transceivers and arbitration means coupled to one of said first and second bus means for determining the one of a plurality of elements connected to said one of the first and second bus means that obtains first use of said connected one of the first and second bus means when more than one of said elements attempt to use one of said first and second bus means simultaneously;
each of said elements comprising means for detecting a faulty element;
self-repair means comprising an element address register in each of said elements for removing said detected faulty element from operating service and replacing said faulty element with a spare element; and
a distributed operating system means in said signal processors for managing said plurality of elements comprising a local level segment of said distributed operating system, DOS-0, for performing individual signal processor management and fault monitoring, and a system level segment of said distributed operating system, DOS-1, for performing system task management, fault monitoring and self-repair.

37. The combination as recited in claim 36 wherein:
said local level segment, DOS-0, of said distributed operating system comprises identical ROMS located in each of said signal processors.

38. The combination as recited in claim 36 wherein:
said first bus means for interconnecting said plurality of elements further comprises two identical busses for fault-tolerant operation capability.

39. The combination as recited in claim 38 wherein:
said second bus means for interconnecting a plurality of said systems further comprises at least two identical buses for fault-tolerant operation capability.

40. The combination as recited in claim 36 wherein:
said plurality of elements, first bus means, second bus means and said self-repairing means in each of said distributed signal processing systems provide an operating capability in the presence of one or more faults in said system.

41. The combination as recited in claim 36 wherein:
said removal of said detected faulty element is accomplished by changing an address in said element address register of said spare element to an address of said faulty element.

42. The combination as recited in claim 36 wherein:
said self-repair means in each of said distributed signal processing systems self-repair without element or system redesign by changing said element address in said element address register causing elements to be added or deleted from operating service.

43. The combination as recited in claim 36 wherein:
each of said input-output controllers comprises a plurality of operating modes which includes a bus extended mode for communicating with said interconnected systems.

44. The combination as recited in claim 43 wherein:
each of said input-output controllers further comprises a dynamic input-output mode for communicating with said input-output data devices.

45. In combination:
a plurality of distributed signal processing systems;
each of said systems comprising a plurality of elements including a plurality of signal processors, a plurality of mass memories and a plurality of input-output controllers, and a first bus means for interconnecting in common said plurality of elements;
each one of said input-output controllers comprising a second bus means for interconnecting a plurality of said systems by coupling said second bus means of one of said systems to said first bus means of another of said systems and for providing coupling to a plurality of input-output data devices;
each of said elements comprising one or more bus transceivers and arbitration means coupled to one of said first and second bus means for determining the one of a plurality of elements connected to said one of the first and second bus means that obtains first use of said connected one of the first and second bus means when more than one of said elements attempt to use one of said first and second bus means simultaneously;
each of said elements comprising means for detecting a faulty element;
self-repair means comprising an element address register in each of said elements for removing said detected faulty element from operating service and replacing said faulty element with a spare element;
said signal processors comprising distributed operating system means for managing processing tasks and self repair means within said plurality of elements and systems; and
arithmetic means in each of said signal processors for performing multiplication and addition operations simultaneously within a single clock cycle time period of said signal processors.

46. In combination:
a plurality of distributed signal processing systems;

each of said systems comprising a plurality of elements including a plurality of signal processors, a plurality of mass memories and a plurality of input-output controllers for fault tolerant operation capability, and a first bus means for interconnecting in common said plurality of elements;

each one of said input-output controllers comprising a second bus means for interconnecting a plurality of said systems by coupling said second bus means of one of said systems to said first bus means of another of said systems and for providing coupling to a plurality of input-output data devices;

each of said elements comprising one or more bus transceivers and arbitration means coupled to one of said first and second bus means for determining the one of a plurality of elements connected to said one of the first and second bus means that obtains first use of said connected one of the first and second bus means when more than one of said elements attempt to use one of said first and second bus means simultaneously;

each of said elements comprising means for detecting a faulty element;

self-repair means comprising an element address register in each of said elements for removing said detected faulty element from operating service and replacing said faulty element with a spare element;

a distributed operating system means in said signal processors for managing said plurality of elements comprising a local level segment of said distributed operating system, DOS-0, for performing individual signal processor management and fault monitoring, and a system level segment of said distributed operating system, DOS-1, for performing system task management, fault monitoring and self-repair;

OPERATE instruction means comprising instructions for performing control operations between an application program and said local level segment, DOS-0, of said distributed operating system, for performing complex signal processing operations including a multiplication of two complex matricies, and a radar target detection and clutter map update calculation and for performing logic and memory diagnostic tests.

47. In a network comprising a plurality of distributed signal processing systems each of said systems comprising a plurality of elements, the method of determining which one of said elements becomes an executive containing a system level segment of a distributed operating system, DOS-1, comprising steps of:

performing self-test programs located in a local level segment, DOS-0, of said distributed operating system in a signal processor when power is applied;

sending a "ready and executive request" message from said signal processor to a mass memory after the successful completion of said self-test programs;

performing bus arbitration if two or more of said signal processors try to use a bus simultaneously for sending said "ready and executive request" message; and preventing more than one signal processor from obtaining said executive of said distributed operating system, by changing the address of said mass memory as soon as said mass memory receives said first "ready and executive request" message resulting in said other signal processors entering an idle state until assigned a task by said executive.

48. In combination
a plurality of elements;
said plurality of elements comprising a signal processor, a mass memory and an input-output controller;
first bus means for interconnecting in common said plurality of elements to form a distributed signal processing system;
a plurality of said distributed signal processing system forming a network comprising a second bus interconnecting means between said input-output controller of one of said systems and said first bus means of another of said systems;
means for communicating between said systems by at least two separate busses; and
said plurality of systems comprising means in at least one element for performing self-repair of said network.

49. In combination:
a plurality of elements;
said plurality of elements comprising a signal processor, a mass memory and an input-output controller;
first bus means for interconnecting in common said plurality of elements to form a distributed signal processing system;
a plurality of said distributed signal processing systems forming a network comprising a second bus interconnecting means between said input-output controller of one of said systems and said first bus means of another of said systems;
means for communicating between said systems by at least two separate busses;
means for communicating with a plurality of input-output data devices by at least two separate busses;
said plurality of systems comprising means in at least one element for performing self-repair of said network; and
said input-output controller comprising a plurality of operating modes including a bus extended mode for communicating between said interconnected systems, and a dynamic input-output mode for communicating with said input-output data devices coupled to said controller.

50. In combination:
a plurality of elements;
said plurality of elements comprising a signal processor, a mass memory and an input-output controller;
first bus means for interconnecting in common said plurality of elements to form a distributed signal processing system;
a plurality of said distributed signal processing systems forming a network comprising a second bus interconnecting means between said input-output controller bus means of another of said systems;
means for communicating between said systems by at least two separate busses;
means for communicating with a plurality of input-output data devices by at least two separate busses;
said plurality of systems comprising means in at least one element for performing self-repair of said network;
said input-output controller comprising a plurality of operating modes including a bus extended mode for communicating between said interconnected systems, and a dynamic input-output mode for communication with said input-output data devices coupled to said controller; and means for managing said network comprising a distributed operating system.

51. The combination as recited in claim 50 wherein: said distributed operating system comprises means for executive control in at least one of said systems.

52. The combination as recited in claim 50 wherein: said self-repair means comprises an element address register in each of said elements for removing a faulty element from operating service and replacing said faulty element with a spare element by changing an address in said address register.

* * * * *

UNITED STATES PATENT OFFICE
CERTIFICATE OF CORRECTION

Patent No. 4,412,281   Dated October 25, 1983

Inventor(s) George A. Works

It is certified that error appears in the above-identified patent and that said Letters Patent are hereby corrected as shown below:

Column 1, Line 5:  Change "throughout" to --throughput--;

Column 7, Line 48:  Change "micro-instructions" to --macro-instructions--;

Column 11, Line 8:  After "signal" delete --,--;

Column 12, Line 55:  Change "LOSE" to --$\overline{\text{LOSE}}$--;

Line 57:  Change "LOSE" to --$\overline{\text{LOSE}}$--;

Column 16, Line 61:  Change "LOSE" to --$\overline{\text{LOSE}}$--;

Column 17, Line 3:  Change "LOSE" to --$\overline{\text{LOSE}}$--;

Column 18, Line 48, Claim 13:  Change "A" to --The--;

Column 19, Line 27, Claim 20:  Change "Claim 9" to --Claim 15--;

Column 23, Line 36, Claim 46:  After "self-repair; insert --and--.

Signed and Sealed this

Thirteenth Day of March 1984

[SEAL]

Attest:

GERALD J. MOSSINGHOFF

*Attesting Officer*   *Commissioner of Patents and Trademarks*